United States Patent [19]

Schonlau et al.

[11] Patent Number: 5,167,441
[45] Date of Patent: Dec. 1, 1992

[54] ANTI-LOCK BRAKE SYSTEM FOR AUTOMOTIVE VEHICLES

[75] Inventors: Juergen Schonlau, Walluf; Alfred Birkenbach, Hattersheim; Rudolf Cezanne, Hofheim; Rudolph Heuer, Friedrichsdorf, all of Fed. Rep. of Germany

[73] Assignee: Alfred Teves GmbH, Frankfurt am Main, Fed. Rep. of Germany

[21] Appl. No.: 612,741

[22] Filed: Nov. 13, 1990

[30] Foreign Application Priority Data

Nov. 15, 1989 [DE] Fed. Rep. of Germany ....... 3937959
Sep. 15, 1990 [DE] Fed. Rep. of Germany ....... 4029332

[51] Int. Cl.⁵ .......................... B60T 8/26; B60T 8/32
[52] U.S. Cl. ..................... 303/92; 188/349;
303/9.63; 303/9.75; 303/14; 303/116.1;
303/119.2; 303/113.4; 303/113.5
[58] Field of Search ............ 303/92, 100, 113 R, 303/113 SS, 113 AP, 115 R, 115 EC, 115 PP, 116 R, DIG. 3, DIG. 4, 9.62, 9.63, 9.69, 22.8, 22.1, 13-15, 9.71, 9.72, 9.73, 111, 117; 188/181 A, 349; 60/545

[56] References Cited

U.S. PATENT DOCUMENTS

| 3,467,440 | 9/1969 | Strien .......................... 303/9.71 X |
| 3,695,732 | 10/1972 | Stelzer .......................... 303/9.73 X |
| 3,727,989 | 4/1973 | Keady .......................... 303/9.63 |
| 3,729,237 | 4/1973 | Ishikawa et al. .................. 303/84.2 |
| 3,804,468 | 4/1974 | Ishikawa et al. .................. 303/9.71 |
| 3,969,001 | 7/1976 | Nakamura et al. ............. 303/9.62 X |
| 4,312,543 | 1/1982 | Kubota .......................... 303/115 EC |
| 4,500,138 | 2/1985 | Mizusawa et al. ................. 303/9.71 |
| 4,632,467 | 12/1986 | Kircher et al. ........... 303/113 AP X |
| 4,647,114 | 3/1987 | Schuett et al. ........................ 303/92 |
| 4,714,296 | 12/1987 | Imoto et al. ........................ 303/9.62 |
| 4,720,151 | 1/1988 | Belart et al. .................... 303/113 AP |
| 4,740,039 | 4/1988 | Hattwig .............................. 303/9.75 |
| 4,840,434 | 6/1989 | Leiber ............................ 303/113 AP |
| 4,890,890 | 1/1990 | Leiber ............................ 303/113 AP |
| 4,943,123 | 7/1990 | Takeda et al. ................ 303/113 AP |
| 4,962,971 | 10/1990 | Miyake .......................... 303/113 AP |
| 4,982,999 | 1/1991 | Rossigno et al. ................... 303/9.63 |

FOREIGN PATENT DOCUMENTS

| 1816994 | 7/1969 | Fed. Rep. of Germany ........ 303/92 |
| 3440541 | 5/1986 | Fed. Rep. of Germany ........ 303/92 |
| 3742173 | 6/1989 | Fed. Rep. of Germany . |
| 2248181 | 5/1975 | France ................................. 303/9.63 |
| 0221753 | 12/1983 | Japan ................................ 303/9.63 |
| 2213543 | 8/1989 | United Kingdom . |

Primary Examiner—Douglas C. Butler
Attorney, Agent, or Firm—Robert P. Seitter; J. Gordon Lewis

[57] ABSTRACT

An anti-locking brake system for automotive vehicles, comprising a tandem master cylinder (1), a device (3, 4) for modulating the pressure supplied to the wheel brakes, an anti-locking control device (2) including a pressure reducing valve (10) located in the rear-axle brake circuit (7). The pressure reducing valve can be activated only in the event of failure of the anti-locking device. To attain a particularly simple and compact design of the re-switchable brakes force distributor (10, 110), an electromagnetic drive (21, 25, 121, 125) is provided and includes an actuating element (20, 120) through which pressure is directly applicable to the valve closing member (16, 116) of the pressure reducing valve (14, 15, 16, 114, 115, 116). To ensure the pressure reducing function even in the event of a failure of the anti-locking device during a brake actuation, an additional arrangement (134, 135, 136) for the volume expansion is provided.

11 Claims, 3 Drawing Sheets

ANTI-LOCK BRAKE SYSTEM FOR AUTOMOTIVE VEHICLES

BACKGROUND OF THE INVENTION

The present invention relates to an anti-locking brake system for automotive vehicles of the type including a master cylinder, means for regulating the pressure supplied to the wheel brakes, and an ALC-control device. The control device includes a monitoring device and at least one brake pressure distributing valve comprising a control piston, a valve closing member and a control spring which are disposed in the rear axle brake circuit and which provide pressure decrease only in case of failure of the anti-locking system.

Brake systems of this type are known from German patent document DE-OS No. 37 42 173, wherein the actuation of the valve closing member is effected through a force-applying piston in communication with the valve closing member. One of the force applying faces of the piston is loaded by the master cylinder pressure and the other of the force applying faces is associated with a control chamber in switchable communication with the master cylinder. While that solution provides for a particularly safe brake system optimally using the brake force of the rear wheel brakes, the design of the re-switchable brake force distributing valve requires extensive mechanical efforts and manufacturing costs and comparatively large assembly space requirements.

It is, therefore, an object of the present invention to provide an anti-locking brake system of the type described which is of a simple yet compact design and which is easy to assemble and to adjust.

SUMMARY OF THE INVENTION

The afore-described problems, in the practice of the present invention, is solved in that pressure is directly applied by the electromagnetic drive to the valve closing member, no hydraulic control chamber including the required connecting passageways is required. As an electromagnetic switch valve is eliminated (which, by itself, will decrease the manufacturing costs), the electromagnetic driving mechanism for actuating the valve closing member with minor modifications, can be integrated into an existing brake force distributing system.

According to a particularly favorable and operationally safe embodiment of the invention, the electromagnetic drive is loaded by a prestressing force directed in a manner that the valve closing manner is allowed to abut the control piston and that, with the anti-locking means being intact, current flows through the coil surrounding the magnetic core, thereby causing the magnetic core to move against the prestressing force. A particularly compact embodiment of the present invention that may also be designed as a screwed-in cartridge for the master cylinder, is attained if the magnetic core exhibits passageways and is located in a chamber of the pressure reducing valve through which the pressure fluid flows. Decoupling between the blocking actuation and the valve closing member also is advantageously provided.

BRIEF DESCRIPTION OF THE DRAWING

Further advantageous features of the present invention and the operation thereof will become manifest from the following detailed description of a preferred embodiment of the present invention with reference to the accompanying drawing wherein.

DETAILED DESCRIPTION

Figure 1:
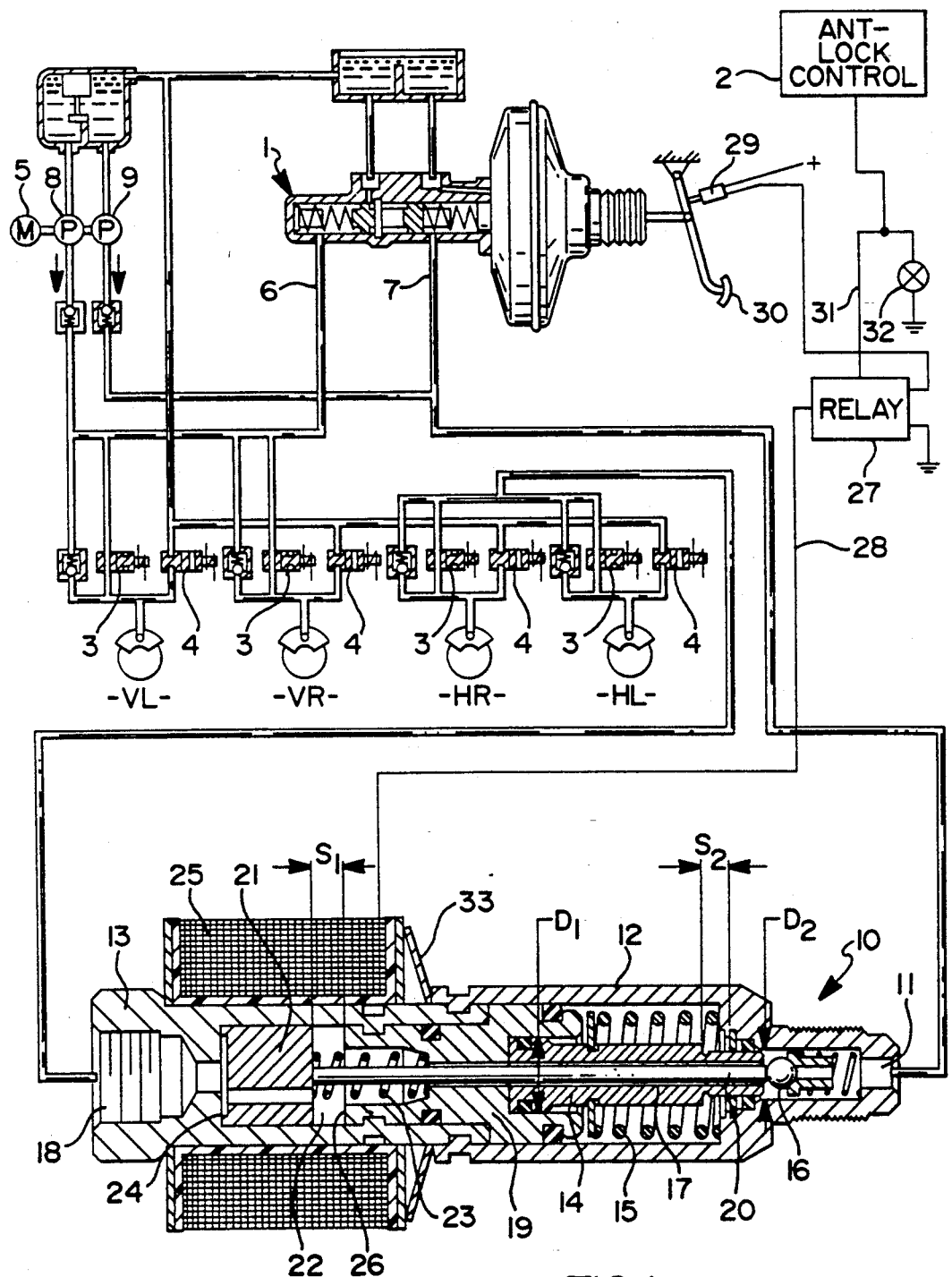
FIG. 1 is the hydraulic part of an anti-locking brake system in accordance with the principles of the present invention with a braking pressure distributor.

FIG. 1 schematically shows the hydraulic portion of an anti-locking brake system. The electrical part of the brake system, for the ease of understanding, has been illustrated only to the extent required to explain the present invention. For example, the sensors for determining the wheel speeds, the connections thereof to the ALC control means 2 into which the monitoring means is integrated, the electrical connection between the inlet valves 3, the outlet valves 4 and the electromotor 5 to the ALC control means 2, and a variety of switches and sensors for monitoring the operation, have not been illustrated.

The brake system includes a tandem master cylinder 1, from which a front axle brake circuit 6 and a rear axle brake circuit 7, through inlet valves 3 configured as magnetic valves which are open in de-energized condition, lead to the associated wheel brakes. Each of the wheel brakes, through an outlet valve 4 configured as a 2-way/2-position magnetic valve closed in de-energized condition, can be placed in communication with a non-pressurized container. This connection, during the ALC control is switched in the associated wheel brake for decreasing the pressure. During an ALC-controlled deceleration, the electromotor 5 also will be actuated to drive the two pumps 8, 9 respectively associated to a brake circuit 6 and 7.

Screwed into the rear axle connection of the tandem master cylinder 1 is a re-switchable brake pressure distributor 10 arranged as a screw-cartridge. The in-screw thread thereof is provided on its first housing portion 12 an inlet bore 11 and is caulked with the second housing portion 13 and receives a pressure reducing valve switching in response to pressure. The pressure decreasing valve comprises the control piston 14, the control spring 15 and the valve closing member 16. The control piston 14 is arranged as a step-type piston provided with a central passage bore 17. Within the inlet bore, the control piston 14 guided with its step of smaller diameter while its step of larger diameter associated to outlet 18 also is sealingly guided in a displaceable manner, within the stepped central bore of the central portion 19.

The control spring 15 prestresses the control piston 14 toward the outlet 18. For that purpose, the control spring 15 is supported on a step of the first housing portion 12, forcing the control piston 14, in the non-actuated condition of the brake system, against a stop of the central portion 19. Disposed within the inlet bore 11 is valve closing member 16 which, through a relatively weak spring, is preloaded toward the valve seat formed on the front side of the smaller step of the control piston 14.

With the brake system non-actuated, the valve closing member 16 is in abutment with an actuating plunger 20 protruding both through the central bore of the central portion and through the passage bore 17 of the control piston 14, with a predetermined play, with the valve closing member 16 being lifted off its valve seat. The end of the actuating plunger 20 opposite the valve closing member 16 is in abutment with a magnetic core 21 which is displaceably disposed in the outlet chamber 22 and which exhibits a variety of axially extending passage bores.

The outlet chamber 22 is formed in the second housing portion 13 which, toward the pressure decreasing valve, is pushed onto and caulked together with central portion 19. The first housing portion 12 surrounds both a section of the central portion 19 and an overlap area of the second housing portion 13. Pressure is applied to the magnetic core 21 through a compression spring 23 toward the outlet 18, with the magnetic core 21 being in abutment with a stop 24 of the second housing portion 13 as long as the coil 25 provided about the second housing portion 13 is in de-energized condition.

Once the coil 25 is in energized condition, the magnetic core 21 will displace against the force of the compression spring 23 to come into abutment with the annular stop face 26 formed by the front face of the central portion 19 protruding into the second housing portion 13. The actuating plunger 20 thereby entrained will displace the valve closing member 16 by the amount $s_1$. The maximum distance $s_2$ that can be covered by the control piston 14 with pressure being applied, against the force of the control spring 15, is less than the amount $s_1$, thereby preventing the control piston 14, with the coil 25 being in energized condition, from coming, with the valve seat thereof, into abutment with the valve closing member 16. Hence, the pressure reducing valve is inoperative.

The current flowing through the coil 25 is switched on by relay 27 in communication with the coil 25 through electrical lead 28. The current flowing through the coil 25 is switched on by relay 27 once the contact of the stoplight switch 29, after actuation of the brake pedal 30, is closed and no control voltage generated by the ALC control means, through relay 31, is available on the relay. Once the operation-monitoring means integrated into the ALC control means 2 detects an interference, a control voltage will be generated which turns on the warning light 32 and discontinues the connection between current source and coil 25, thereby rendering the brake pressure distributor 10 operative as the magnetic core 21, under the action of the compression spring 23, comes into abutment with the stop 24.

The basic configuration of the brake force distribution is such that the rear axle brakes are heavily loaded, thereby effectively releasing the front wheel brakes in about 90% of all decelerations performed during normal operation. In view of this arrangement, the rear wheel brakes, in heavy decelerations, will, of course tend to lock which, however, is safely precluded with an intact ALC-system by controlling the rear axle pressure through the inlet and outlet valves 3, 4, respectively.

To insure a stable driving condition during a deceleration process even in the event of a failure of the ALC-system, the pressure reducing valve 10 switching in response to pressure, is integrated into the rear axle brake circuit to become effective only in case of an ALC failure. In that case it will safely operate as it will become automatically operative upon the occurrence of a lack of coil current.

The simple design of the re-switchable brake pressure distributing valve 10 according to the present invention is particularly suitable for an automatic assembly and adjustment which takes place described hereinafter. First, the magnetic core 21, through the compression spring 23, and the actuating plunger are placed into the outlet chamber 22, and the central portion 19 inclusive of the sealant is pushed into the second housing portion 13, with the amount $s_1$ being adjusted by corresponding stops, on the central portion 19 and on the second housing portion 13. The second housing portion and the central portion, through a shearing connection, are subsequently caulked with one another. The pre-mounted unit is then pushed through the coil 25 coming into abutment with an external step of the second housing portion 13 formed in the area of the outlet 18. Subsequently, a flexible holding plate 33 is pushed onto the second housing portion 13. After the control piston 14 with the pre-mounted control spring 15 is pushed over the actuating plunger 20, the first housing portion 12 with the pre-assembled valve closing member 16, through the central portion 19, is pushed over the second housing portion 13. The second housing portion 13 is fixed while a defined force is applied to the first housing portion 12. This loading will adjust the prestressing force of the control spring 15 to caulk the two housing portions 12, 13 with one another prior to releasing the first housing portion 12.

The coil 25, through the holding plate 33, during this operation, is at the same time axially fixed. The slight resilient deformation of the holding plate 33, during the process of adjustment of the control spring 15, does not affect the adjustment of the controller as the forces to be applied to the holding plate 33 are very low. In this regard, the holding plate 33 is intended to preclude the coil body from rattling. The forces resulting from the magnetic force, acting on the coil 25 under the application of current, are dissipated through the housing step formed in the area of the outlet 18.

The pressure decreasing valve, with the coil switched off, operates in a known manner, with the re-switching pressure being determined by the control spring 15, and the decreasing ratio being determined by the ratio of the faces on the control piston 14 to which pressure is applied.

Figure 2A:
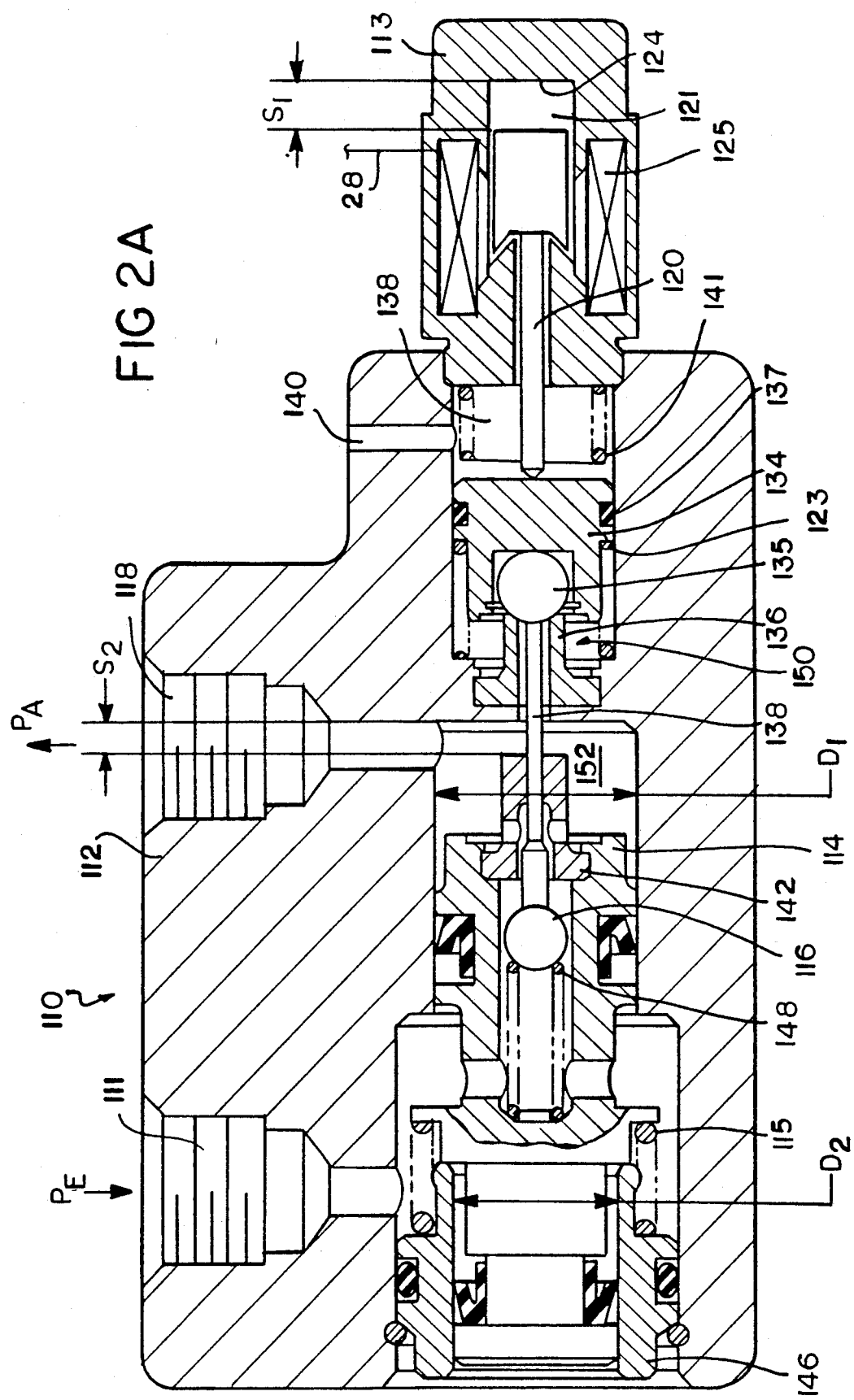
FIG. 2A is a partially sectional view of a second embodiment of the braking pressure distributor in accordance with the present invention shown in the deactivated condition with the antilock device intact.
Figure 2B:
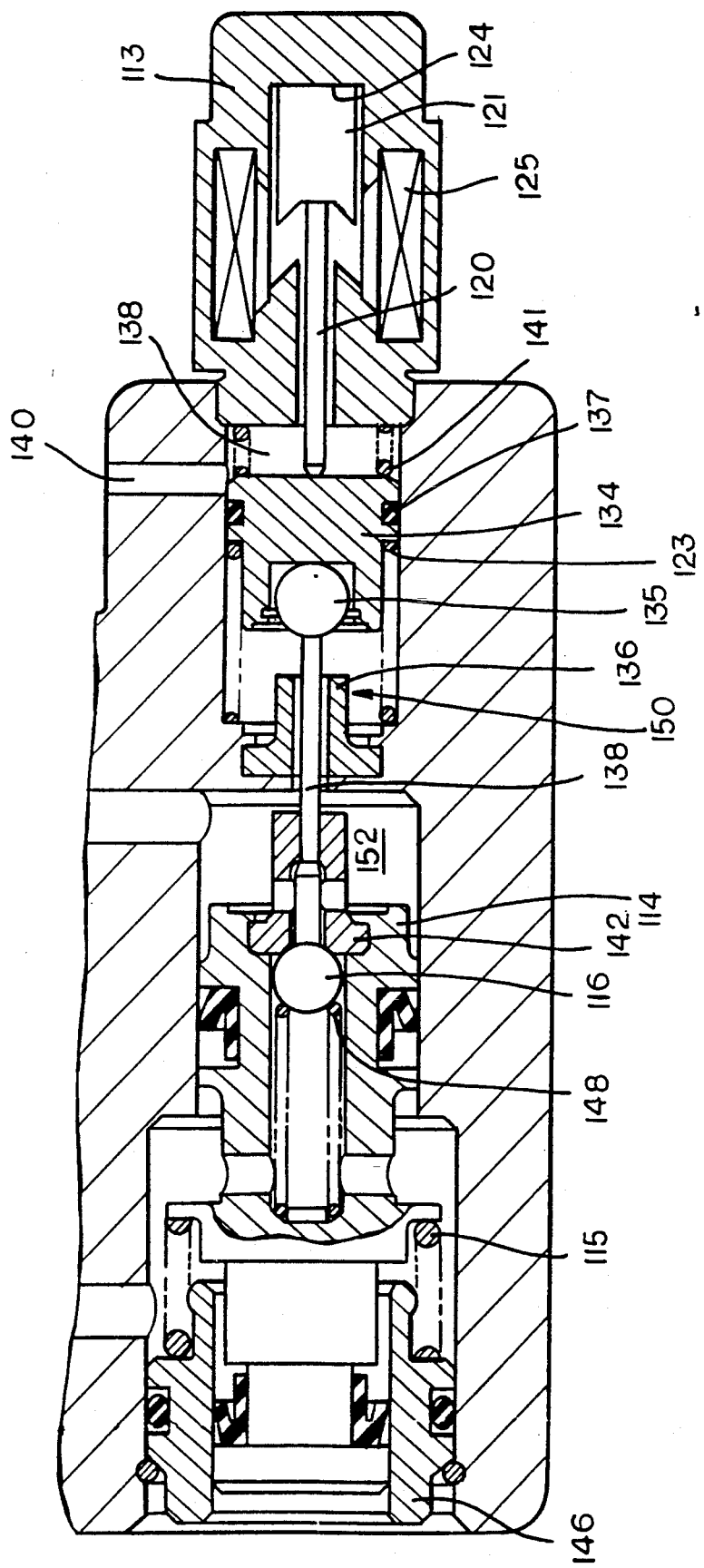
FIG. 2B is a partially sectional view of the embodiment shown in FIG. 2A, in the activated condition occurring with a failure of the antilock device.

The reference numerals of FIGS. 2A and 2B which correspond to those in FIG. 1 have been augmented by 100 in FIGS. 2A and 2B. FIG. 2A shows the braking pressure distributing means 110 in its inactivated condition with the anti-lock device intact, while FIG. 2B illustrates its activated condition occurring when the anti-lock device has failed and is in the pressure reducing function. The inlet 111 and the outlet 118 are disposed radially in this configuration of braking pressure distributing means 110. All hydraulic elements are placed in a stepped bore in the first housing portion 112, while the second housing portion 113 encloses a proportional magnet which essentially is composed of an electric coil 125 and a magnetic core 121 and is supplied with control current by way of the electrical line 28.

As long as the anti-locking device is functionally intact, the electric coil 125 is supplied with a control current and draws the magnetic core 121 into its magnetic field. The magnetic core 121 presses, through the actuating tappet 120, the piston 134 with the valve closing member 135 to bear against the valve seat 136 integrally formed with the housing. The valve closing member 135 is inserted into a cavity in the piston 134 so that it has little radial clearance in order to conform its position to the valve seat thereby to ensure seal-tightness. The piston 134 is sealed in relation to the bore wall by the ring seal 137. The interspace 139 between the piston 134 and the second housing portion provides a compensating bore leading to the atmosphere. A compression spring 141 is placed in this interspace 139 which spring 141 is shorter than the interspace 139 available when the controller is closed so as to leave engagement with the piston 134 as shown in FIG. 2A. However, spring 141 is stiffer than the compression spring 123 which permanently acts upon the piston 134 in the direction of the magnetic core 121.

When the electric coil 115 is energized, the actuating tappet 138 abuts on the valve closing member 135 which projects through the valve seat 136 and the valve seat 142 fixed on the control piston 114 and which keeps the valve closing member 116 away from its valve seat 142 in opposition to the prestress provided thereon by spring 148. The control piston 114 is displaced against its control spring 115 due to the surface ratios and due to the pressure balance on inlet 111 and outlet 118 to reduce outlet pressure, when the braking pressure distributor is activated in the same manner as in the embodiment of FIG. 1.

Once the anti-lock device fails, the control current is interrupted, and the magnetic core 121 returns to the stop 124 caused by the force of the compression spring 123 and the pressure in the first housing portion 112. The valve closing member 135 lifts with the piston 134 from the valve seat 136 admitting fluid in the intermediate space between the piston 134 and the valve seat 136. This causes the piston 134 to move to the right to engage the spring 141 with further movement compressing the spring 141. Simultaneously, the valve closing member 116 in the control piston 114 moves to bear against its valve seat 142 to reduce pressure, as in the embodiment of FIG. 1. As a result of the stroke $S_1$ of the piston 134 which is in excess of the stroke $S_2$ of the control piston 114, an expansion of volume will occur in the intermediate space adjacent the piston 134, which results in a reduction in the outlet pressure $P_A$, while the inlet pressure $P_E$ remains unchanged. The spring constant of the compression spring 141 dictates the extent of the volume expansion in the space behind piston 134 as a function of the outlet pressure $P_A$. Thus, the control piston 114 starts its pressure-reducing function proportionally to the outlet pressure.

Mode of Operation of the Valve of FIGS. 2A, 2B:

In the valve of FIG. 2A, 2B, the armature acts on the first plunger 120, which pushes a second piston 134, which pushes the second ball valve element 135 which pushes the second ball valve element 135 which pushes the first plunger 138 which moves the ball 116 to the left away from the valve seat 142 at the right end of the control piston 114 sufficiently far that the control piston 114 cannot move far enough to the left to cause restriction of flow through the valve seat 142 since it first abuts against the plug 146 at the left in the housing.

When the plunger 138 is moved to the right by the retraction of the armature 121 caused by the force of the armature spring 123 after the coil 125 is deenergized, the control piston 114 can move to the left sufficiently to begin restricting flow by the valve ball element 116 moving to the valve seat 114. This leftward movement of the control piston 114 is caused by the hydraulic forces acting on the different sized diameter D1, D2 and the force of the control spring 115, as in the embodiment of FIG. 1, except that the direction of movement onto the ball to increase restriction is to the right in FIG. 1, rather than to the left as here.

An added feature is provided by the second piston 134 interposed in the mechanical connection between the core 121 and the ball valve element 116, and the spring 151, which is short enough to not engage the second piston 134 when the core 121 is advanced as shown in FIG. 2A, but is engaged when the core 121 is retracted.

A second valve is created by the second valve element 135 and second valve seat 136 which either opens or closes an expansion space 150 to communication with the space 152 communicating with the outlet 118.

When the core 121 is retracted by the armature spring 123, the valve element bal moves off the seat 136 allowing fluid to expand into the space 150 and allowing a reduction in the outlet pressure PA at the first start of the restriction action by the control piston 114.

What is claimed is:

1. An automotive hydraulic brake system including a master cylinder, a hydraulic circuit, front and rear brakes having front and rear brake cylinders connected to said master cylinder by said hydraulic circuit, and a brake pedal for operating said system by applying hydraulic pressure to said front and rear brake cylinders, and anti-locking brake control system for automatically controlling braking pressure in a lock up condition of said front and rear brakes, said anti-locking brake control system also including pump means for supplying hydraulic pressure to said front and rear brake cylinders, and a control circuit and associated valve means for controlling pressurizing of said front and rear brake cylinders, and proportioning valve means for reducing the pressure applied to said rear brake cylinders, said proportioning valve means comprising:

proportioning valve housing means having a bore formed therein;

an electromagnet coil mounted on said housing means during brake system operation, and said control circuit including means normally energizing said electromagnet coil during braking system operation, but causing deenergization thereof during brake system operation upon detection of a failure of said anti-locking control system;

an armature mounted in said bore in said housing means and shifted axially to an advanced position in said housing bore upon energization of said electromagnetic coil;

an armature spring urging said armature to a retracted position in said housing means bore;

a control piston slidably mounted in a stepped bore in said housing means aligned with said armature bore, said control piston having portions with different sized diameters;

a control piston bias spring urging said control piston towards said armature;

inlet means in said housing means for admitting hydraulic pressure to be applied to said rear brake cylinders into said housing means, said hydraulic pressure applied thereby to a smaller diameter portion of said control piston;

valving means associated with said control piston receiving fluid flow from said inlet means, including a valve seat carried by one end of said control piston, a valve closing element and positioning means positioning said valve element to be adjacent said valve seat, movement of said control piston away from said armature causing said valve seat to approach said valve element;

fluid passage means formed in said control piston and communicating with said valve seat to receive flow past said valve element, said fluid passage means communicating pressure therein to a larger diameter portion of said control piston, said control piston able to be shifted under the influence of fluid pressure on said larger and smaller diameters and said bias spring towards said valve element to reduce fluid pressure by restricting flow past said valve element;

outlet means in said housing means receiving fluid from said fluid passage means, and connected to said rear brake cylinders;

an actuating plunger drivingly interconnected with said armature and with said valve element to cause said valve element to be shifted away from said valve seat upon energization of said electromagnetic coil a sufficient distance to prevent a flow restriction by shifting of said control piston and valve seat to a position closely adjacent said valve element, whereby said proportioning valve means is rendered ineffective upon energization of said electromagnet coil.

2. The brake system according to claim 1 wherein said actuating plunger is contacted at one end with said armature and extends through said fluid passage means in said control, said actuating plunger having another end protruding through said valve seat and into contact with said valve element.

3. The brake system according to claim 2 wherein said armature is shifted axially a rpedetermined fixed distance upon energization of said electromagnetic coil, and wherein said control piston is mounted for a limited range of axial movement towards said valve element to produce said restriction of flow past said valve element, and wherein said fixed distance said armature is shifted is substantially greater than the range of movement of said control piston, whereby said valve element is shifted sufficiently by said actuating plunger to prevent any flow restriction by said control piston.

4. The brake system according to claim 1 wherein said outlet means includes at least one through opening extending through said armature and an outlet port receiving flow therefrom.

5. The brake system according to claim 1 wherein said valve element comprises a ball and said valve seat comprises an opening in said one end of said control piston positioned to be covered by said ball by movement of said control piston towards said ball.

6. The brake system according to claim 1 wherein said electromagnetic coil is mounted onto and surrounding a portion of said housing means.

7. The brake system according to claim 6 wherein said housing means includes three parts, one part containing said armature and having said electromagnetic coil mounted thereon, another part containing said control piston, valve element, and bias spring, said another part fastened to said one part, and a third part disposed within said first and second parts and fastened thereto, said third part having a bore receiving an end of said control piston opposite said one end carrying said valve seat.

8. The brake system according to claim 1 wherein said outlet means includes an outlet passage extending through into said bore in which said armature is mounted and further including a through passage extending from one end to the other of said armature to allow flow therefrom to said outlet passage.

9. The brake system according to claim 1 further including a second piston interposed between said armature and said actuating plunger, said second piston being slidably mounted in said bore in said housing means, an expansion space defined by a portion of said bore and one end of said second piston, a second spring acting on the other end of said second piston but only with said armature in retracted position, said outlet means including a space defined in part by said one end of said control piston, and outlet passage in said housing means extending into said space, second valving means allowing communication from said space to said expansion space only when said armature is retracted, whereby said expansion space can receive fluid from said outlet passage to expand said expansion space by compression of said second spring by retraction of said second piston by fluid pressure in said outlet passage but only with said armature in said retracted position.

10. The brake system according to claim 9 wherein said armature spring acts through said second piston on said armature, and said second spring is opposed thereto, and is stiffer than said armature spring.

11. The brake system according to claim 10 wherein said housing means includes a wall aligned with said second piston, said second spring interposed between said wall of said housing means and said second piston, said second piston shorter than the distance between said wall and said second piston with said armature shifted to said advanced position and advancing said second piston away from said housing means wall.

* * * * *